Jan. 29, 1952
A. T. A. MOCIUN
2,583,868
RESISTANCE WELDED DOME NUT
Filed Aug. 22, 1949
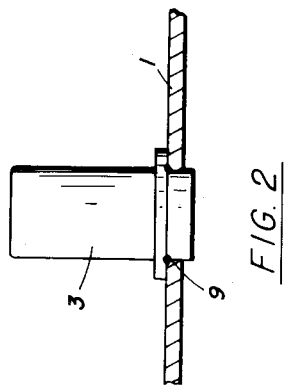
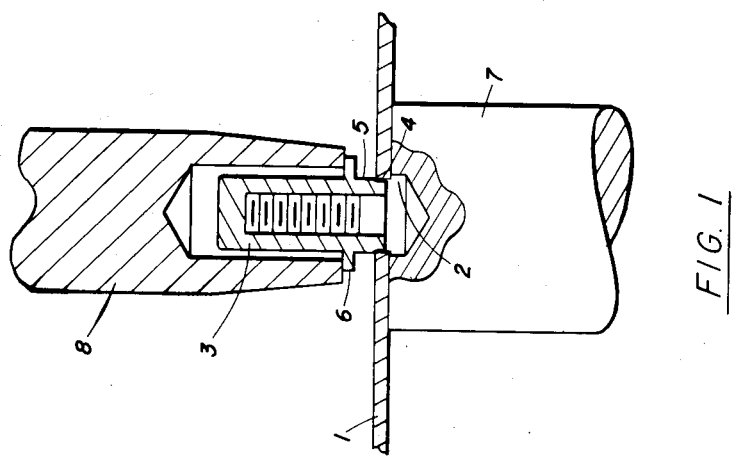
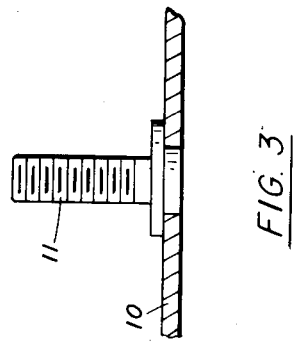
INVENTOR.
ANTHONY THADDEUS A. MOCIUN
BY
ATTORNEY Patented Jan. 29, 1952

2,583,868

UNITED STATES PATENT OFFICE 2,583,868

RESISTANCE WELDED DOME NUT

Anthony Thaddeus A. Mociun, Manhattan Beach, Calif., assignor to North American Aviation, Inc.

Application August 22, 1949, Serial No. 111,599

7 Claims. (Cl. 219—10)

This invention pertains to the attachment of dome nuts or studs to pressure vessels.

The provision of manhole type covers for large, thin walled pressure vessels, which may be opened for filling, emptying or cleaning, necessitates the use of fastening means which may be readily unfastened and which provide a pressure tight junction with the pressure vessel when the pressure vessel is in use. In the past it has been customary to provide a ring of dome nuts around the manhole, installed so as to be flush with the external contour of the pressure vessel, with the female threaded portion of the dome nut extending through the wall of the pressure vessel into the interior. The pressure vessel itself has ordinarily been fabricated to practical completion, and then holes have been drilled around the manhole at predetermined intervals and dome nuts have been secured in the holes in pressure tight relationship with the vessel walls. A screw type joint has ordinarily been unsatisfactory because of pressure leakage. A soldered joint is very often unsatisfactory because of the operating temperature of the pressure vessel. On the other hand, seam welding or spot welding the dome nuts into position has not been sufficient because of the impossibility of obtaining a consistently uniform weld such that the internal pressure of the vessel may be maintained. Likewise, riveting dome nuts or stud bolts to the pressure vessel walls has been unsatisfactory because the wall is usually very thin and cannot withstand the forces used in riveting without warpage and permanent deformation. The present invention contemplates a method calculated to assure a positive uniform weld and a weld which is leak-proof.

It is therefore an object of this invention to provide a dome nut and thin pressure vessel wall which is uniformly fused and welded in pressure tight relationship.

It is another object of this invention to provide a method of welding dome nuts and other similar elements, such as studs, to the wall of a thin-walled pressure vessel in pressure tight relationship.

It is another object of this invention to provide a simple and inexpensive method of securing self-locking dome nuts to a pressure vessel having a thin wall.

Other objects of the invention will become apparent from the following description taken in connection with the accompanying drawings in which:

Fig. 1 is a sectional schematic of the invention,

Fig. 2 is an elevational view partially in section showing a dome nut welded into the wall of the pressure vessel, And Fig. 3 is an elevational view partly in section of a stud bolt fastened to thin sheet metal by this method.

Referring to Fig. 1, a pressure vessel wall 1 is shown with a circular hole 2 and a dome nut 3 partially inserted into the hole. The pressure vessel wall may be of stainless steel, aluminum alloy, or any metal which is adaptable to resistance welding methods. Dome nut 3, at the end which is partially inserted into the hole, is of slightly reduced diameter over a small portion 4 of the tip thereof, and is of the same material as the pressure vessel wall. The dome nut also has a slight shoulder 5 which is of a diameter such that it forms a press fit with hole 2. A retaining shoulder 6 is also provided on dome nut 3, while internal threads are provided in the dome nut to receive attachment bolts of the manhole cover.

The invention is assembled as follows:

The dome nut 3 is press fit into the hole 2 in the pressure vessel wall, and current is applied through welding electrodes 7 and 8 for such time as is necessary for shoulder portion 5 of the dome nut to be fused with the material of pressure vessel wall 1. Fig. 2 shows the final result attained by this procedure, the fusion being uniform throughout the circumference of the dome nut. It is to be noted that the preeminent advantage of this method of securing the dome nut to the pressure vessel wall is that a uniform welding pressure is secured around the circumference which is to be welded. Little or no pressure, therefore, needs to be furnished by the welding electrodes, and a pressure tight joint between the vessel wall and the dome nut is assured. The press fit may be attained either simultaneously with the welding by action of specially constructed welding electrodes, as shown in Fig. 1, or may be attained separately by pressing the dome nut into the hole separately on subassembly before welding. A press fit assures a uniform distribution of current flow around the circumference of the dome nut into the surrounding pressure vessel wall material so that the welded area 9 in Fig. 2 is of substantially uniform cross section. Furthermore, very accurate location of the dome nuts may be attained because the nuts are press fit to the accurately located holes. Thereafter no forces likely to cause misalignment of the nut are applied in the method here related.

This method may also be employed advantageously in installing studs and plate nuts whether or not they are required to withstand fluid pressure. The advantage is that since the nuts or studs are press fit they can be accurately located and fixed permanently in position. Fig. 3 shows a stud 11 welded in position in sheet material 10. Thus this method allows the attachment of the stud to very thin sheet material without riveting action which would deform the sheet metal.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A method for attaching a metallic dome nut to a metallic pressure vessel in pressure tight relationship comprising press fitting the dome nut of fixed outside dimensions into a hole of similar but slightly smaller dimensions in the pressure vessel and passing a welding current through said press fit to fuse the metal around the circumference of said dome nut.

2. An article of manufacture comprising a cylindrical metallic body adapted to be welded in a hole in a sheet metal member and having a diameter at one end smaller than said hole and a portion adjacent thereto from .001 inch to .008 inch larger in diameter than the diameter of said hole whereby said first-named portion may be inserted in said hole and said second-named portion may be press fit to said hole to provide a uniform welding pressure for welding to said sheet metal member in pressure tight relationship.

3. An article of manufacture comprising a metallic body adapted to be welded into a hole in a thin sheet metal member and having a portion at one end which is smaller in cross-section than said hole and a portion adjacent thereto which is of slightly larger cross-section than said hole terminating in a shoulder portion larger than said hole whereby said body may be press fit into said hole and resistance welded to said thin sheet metal member in pressure tight relationship.

4. A device as recited in claim 3 in which said body is a metallic dome nut adapted to be electrically welded to a pressure vessel wall, whereby a pressure tight manhole cover attachment means is provided.

5. A device as recited in claim 3 in which said body is a metallic stud bolt adapted to be welded to a thin sheet metal member whereby said stud bolt may be resistance welded to said thin sheet metal and deformation of said sheet metal member is avoided.

6. The method of attaching a solid metallic body to a sheet metal member adapted for resistance welding comprising providing a hole in said sheet metal member, dimensioning said solid body with one end portion smaller than said hole, an adjacent portion with a slightly larger section than said hole, providing a shoulder on said body larger than said hole and adjacent to said last-named portion, press fitting said body into said hole with said shoulder as a stopper, and applying welding current to said sheet and said body until fusion of metal occurs along said press fit surface.

7. An assemblage to be welded comprising a metallic body of generally cylindrical shape having a portion at one end of reduced cross-sectional area, a central cylindrical section, and an enlarged collar portion; and a sheet metal member having an opening congruent with the central portion of said body whereby said body may be press fit into said hole and then resistance welded in its cylindrical portion to said sheet member in pressure tight relationship.

ANTHONY THADDEUS A. MOCIUN.

REFERENCES CITED

The following references are of record in the file of this patent:

UNITED STATES PATENTS

| Number | Name | Date |
| --- | --- | --- |
| 1,499,172 | Greenslade et al. | June 24, 1924 |
| 2,167,285 | Smith | July 25, 1939 |
| 2,202,405 | Smith | May 28, 1940 |
| 2,272,283 | Widgren | Feb. 10, 1942 |